Oct. 4, 1966     M. C. SZE     3,277,179
MANUFACTURE OF AQUEOUS FORMALDEHYDE
SOLUTION AND PARAFORMALDEHYDE
Filed Jan. 2, 1962
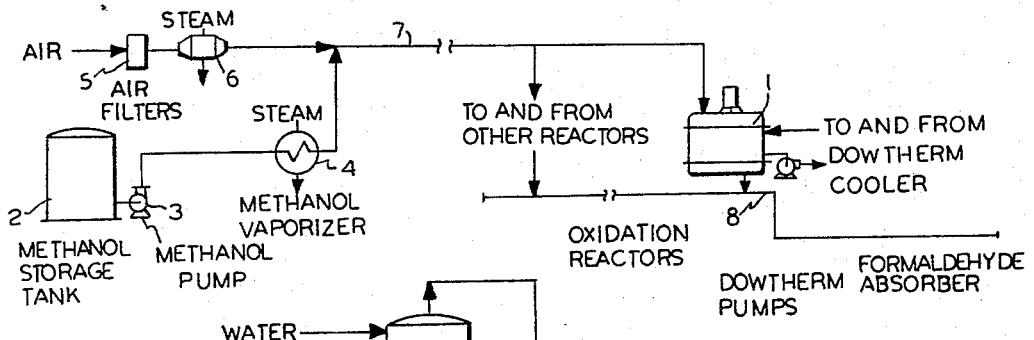
FIG.1
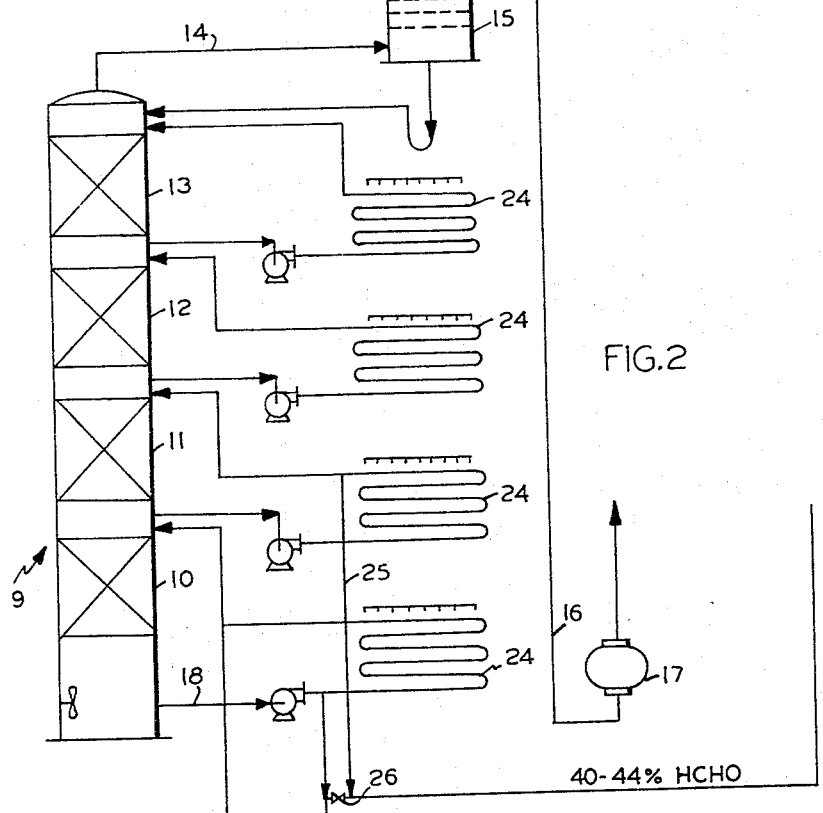
FIG.2
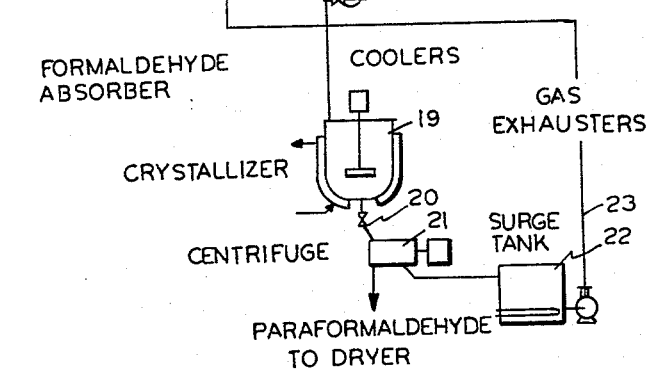
INVENTOR.
BY *Louis E. Marc*
AGENT

United States Patent Office 3,277,179
Patented Oct. 4, 1966

3,277,179
MANUFACTURE OF AQUEOUS FORMALDEHYDE SOLUTION AND PARAFORMALDEHYDE
Morgan C. Sze, Garden City, N.Y., assignor to The Lummus Company, New York, N.Y., a corporation of Delaware
Filed Jan. 2, 1962, Ser. No. 163,724
3 Claims. (Cl. 260—603)

The present invention relates to the production of paraformaldehyde, and more particularly, it relates to the direct production of paraformaldehyde in a process for the production of formaldehyde by the catalytic oxidation of methanol.

Formaldehyde is commercially produced by oxidizing methanol with air in the present of a suitable catalyst. Two main types of catalysts are used; namely, (1) a metallic catalyst usually consisting of metallic copper, metallic silver, etc., usually in the form of wire screens, and (2) an oxide-type catalyst, usually a mixture of two oxides, such as a mixture of iron oxide and molybdenum oxide, etc. When the metallic-type catalyst is used, an excess amount of methanol is used in the reactor feed so that, after the oxidation reaction, there will be unreacted methanol contained in the formaldehyde product. The oxide-type catalyst requires excess air in the reactor feed. After the oxidation reaction, essentially all the methanol is oxidized. Following the oxidation reaction, the formaldehyde-containing gases are absorbed to produce a formaldehyde solution. When the oxide-type catalyst is used, the formaldehyde solution obtained is essentially methanol-free.

The present invention is concerned with the production of formaldehyde using the oxide-type catalyst and the production of paraformaldehyde.

Paraformaldehyde is normally not directly produced in a formaldehyde plant. Commercial forms of paraformaldehyde are produced by the evaporation of an aqueous solution of formaldehyde. Evaporation is carried out under reduced pressure in an elaborate vacuum distillation unit to avoid extensive loss of formaldehyde in the given effluent from the unit. This process has numerous disadvantages. When an aqueous solution of formaldehyde is heated in a still to its boiling point under atmospheric pressure, a large portion of the formaldehyde product is lost with the vapors and only a small amount of paraformaldehyde is obtained from the still bottoms. Also, since the operation is performed batchwise, the method is costly and the product has inconsistent chemical and physical properties.

The present commercial processes of this type involve taking a 37 to 44% formaldehyde solution as produced in a formaldehyde plant, and treating it in a vacuum distillation unit. The highly concentrated solution is the cooled, flaked, dried, ground and packed.

Another known method for producing paraformaldehyde involves introducing a vapor feed of relatively high formaldehyde content, e.g., containing 60 to 90% by weight of formaldehyde, into an organic liquid quenching medium which is a non-solvent for the formaldehyde and which also contains an added alkaline or acidic material which acts as a polymerization catalyst. The formaldehyde vapors are condensed as they pass into the non-solvent organic quenching medium; and, under the action of the alkaline material present in the quenching medium, a rapid polymerization of the formaldehyde condensate takes place. The quenching medium is then passed to a settling chamber where further polymerization occurs and the paraformaldehyde separates out at the base of the chamber to be removed as a liquid slurry.

It is an object of my invention to produce paraformaldehyde from a formaldehyde solution.

It is another object of my invention to produce paraformaldehyde from formaldehyde solution in a formaldehyde plant with the simultaneous production of an aqueous solution of formaldehyde.

Another object of the invention is to provide a new and novel process for the production of paraformaldehyde which can be conducted in a standard methanol-oxidation formaldehyde production plant.

Other objects of the invention will become apparent as the description thereof proceeds.

Broadly, my process comprises passing methanol and air in a ratio of air to methanol of about 14:1 through oxidation reactors containing an oxide-type catalyst. The catalyst bed is maintained at as nearly a constant temperature of between about 300° to 350° C. as possible by circulating a cooling medium, such as Dowtherm, outside of tubes packed with the catalyst. The hot reactor effluent then flows into a multi-section water absorption tower wherein the formaldehyde product is obsorbed in a number of sections. Heat is removed from this tower by circulating the liquid formaldehyde solution formed through intercoolers in four sections. The overhead gas leaving the absorber contains only a small amount of formaldehyde, and this substantially absorbed in a final water scrubber. From the final scrubber, the tail gas is exhausted to the atmosphere.

As the water passes downwardly through the absorption tower in contact with the reactor effluent, the concentration of the formaldehyde in the absorption medium increases. The side stream near the lower portion of the absorber usually has a concentration of formaldehyde from about 55 to about 65 weight percent, preferably about 60 weight percent. This concentrated solution is withdrawn and sent to a crystallizer wherein the solution is cooled causing paraformaldehyde crystals to be formed. The crystals are separated from the mother liquor, and the mother liquor is recycled back to the absorption tower. Accordingly, there is no requirement of an elaborate vacuum distillation system, and a large portion of the formaldehyde produced may be obtained in the form of solid paraformaldehyde. A 37 to 48 weight percent formaldehyde stream is also withdrawn as product from the absorption tower. A yield of approximately 50 weight percent of paraformaldehyde can be obtained according to the present process. This product, after drying, comprises 91 to 94% HCHO and less than 0.04% HCOOH, and is snowy white. The remaining portion of the formaldehyde formed in the reactor is recovered as product, and has a concentration of from 37 to 48 weight percent formaldehyde.

Crystallization of paraformaldehyde from a solution containing 55 to 65% formaldehyde, 10 to 15% methanol, and 35 to 20% water has been heretofore accomplished only by very tediously performed and expensive processes. These procedures for crystallizing paraformaldehyde involved cooling a solution of formaldehyde and methanol obtained from the reaction gases of a methanol oxidation reaction using a metallic catalyst. The solution is cooled at an extremely slow rate of 1 to 3° C. per hour and forms a product of poor quality. At least 24 hours are required for the crystallization step. This process requires large size equipment to provide the required holding time. Slow cooling and large equipment is obviated by the present process which involves crystallization from a solution methanol-free formaldehyde.

Concentration of formaldehyde-containing solutions in water-absorption towers to produce paraformaldehyde is known; however, the known processes entail serious disadvantages which are overcome by the present invention. Heretofore, formaldehyde-containing conversion gases have been passed through a succession of progressively less concentrated solutions of formaldehyde in a plate column whereby the fractions become more concentrated in formaldehyde and concentrate the formaldehyde to liquid paraformaldehyde (93% to 96% formaldehyde). The system must be provided with a means for removing excess water and methanol, and is disadvantageous, since paraformaldehyde will coat the plate column and thus require higher maintenance costs. Also, the degree of polymerization of the paraformaldehyde is higher because of the long residence time and the high temperatures. Furthermore, since the degree of polymerization is high, the rate of dissolution of the product in water is slow.

The processing steps of the present invention will be more clearly apparent by reference to the accompanying drawing.

Referring to the drawing, FIGURE 1, reference numeral 1 designates an oxidation reactor wherein a mixture of air and methanol gases are catalytically converted into a formaldehyde-containing reactor gas. Methanol from the storage tank 2 is introduced into the reactor 1 by means of pump 3, and is vaporized by steam during passage through heater 4. Air is passed through air filters 5 and is preheated in heater 6 prior to mixing with the vaporized methanol in line 7. The air and methanol are introduced in a ratio of about 14:1, air to methanol into the reactor 1 which contains an oxide-type oxidation catalyst. Reactor 1 is of any conventional type wherein the catalyst bed is maintained at a temperature of between about 300° to 350 C., by circulating a cooling medium, for example, Dowtherm, around the tubes packed with the catalyst.

The hot formaldehyde-containing, gaseous reactor effluent is withdrawn from reactor 1 through line 8 and is introduced into a multi-section absorption tower 9, of FIGURE 2. Heat is removed from this tower by circulating the liquid formaldehyde solution formed in the four sections, 10, 11, 12 and 13 through intercoolers. The overhead gas leaving the absorption tower 9 is passed through line 14 into a final water scrubber 15 wherein the small amounts of formaldehyde, which are contained therein, are completely absorbed. From this final scrubber, the tail gas is exhausted via line 16 into the atmosphere by a gas pump 17.

As the water passes downwardly through the absorption tower 9, its formaldehyde concentration increases. The lowest side stream withdrawn through line 18 from the tower section 10 near the bottom of the absorber 9 has a concentration ranging from 55 to 65% by weight of formaldehyde. A portion of the formaldehyde solution in line 18 is passed into a crystallizer 19 for formation of the paraformaldehyde crystals. When the crystallizer is operated so as to provide cooling rate in excess of 10° C. per hour, the quality of crystals formed is excellent. The cooling rate must be at least 5° C. per hour, and preferably above 10° C. per hour. The paraformaldehyde crystals are separated in centrifuge 21 and passed into a dryer (not shown). The mother liquor from the centrifuge flows through surge tank 22 before being returned to the absorption tower 9 through line 23.

From each of the sections 10, 11, 12 and 13 of the absorption tower 9, a portion of the formaldehyde solution is withdrawn and passed through water intercoolers 24 for removing heat so as to improve the absorption of the formaldehyde in the reactor effluent.

Cooled formaldehyde product solution may be withdrawn through lines 25 and 26, respectively, from sections 10 and 11 of the absorber 9 and passed to formaldehyde storage tanks (not shown). This concentrated formaldehyde solution is a product of the plant according to the present process as are the paraformaldehyde crystals separated in centrifuge 21.

The temperature of the absorption tower bottoms is maintained at approximately 85° C., but must be maintained at least above 70° C. The crystallizer outlet temperature is maintained at about 30° C. The preferred catalyst suitable for use in carrying out the oxidation of methanol in accordance with the present process is a mixture of iron oxide and molybdenum oxide, although other oxide-type catalysts may be used.

Considering a specific example of the process according to the present invention, a mixture of air having a composition of 19.9% oxygen, 74.3% nitrogen, 4.8% water vapor and 1% inerts and methanol is fed to the reactor 1 in a weight ratio of 14:1 (dry basis), and has the following composition:

|  | Mols/hr. | Mols/hr. |
|---|---|---|
| Methanol | 262.5 |  |
| Air | 4,259 |  |
| $O_2$ |  | 850.0 |
| $N_2$ |  | 3,165.0 |
| inerts |  | 41.0 |
| $H_2O$ |  | 203.0 |
|  | 4,521.5 | 5,259.0 |

$Air/CH_3OH = 14:1$ (dry basis).

The reactor contains an oxide-type catalyst, as discussed above, and is maintained at a temperature between approximately 300 and 350° C. A gaseous effluent is withdrawn from the reactor and has the following composition:

| | Mols/hr. |
|---|---|
| Formaldehyde | 245.3 |
| $CO_2$ | 17.2 |
| $O_2$ | 701.5 |
| $N_2$ | 3165.0 |
| Inerts | 41.0 |
| $H_2O$ | 482.7 |
| | 4652.7 |

This reactor effluent is passed through line 8 to the absorber 9. The absorber bottoms temperature is maintained at approximately 85° C. A 60% formaldehyde solution is withdrawn from the lower-most section 10 through line 18, while a 37% formaldehyde solution is withdrawn from section 11 through line 25. The 60% formaldehyde solution is introduced into crystallizer 19 wherein paraformaldehyde is crystallized and paraformaldehyde crystals are subsequently separated from the mother liquor in the centrifuge 21. 2086 pounds of paraformaldehyde crystalline product (dry basis) is withdrawn from the crystallizer. The mother liquor separated in the centrifuge 21 and containing about 50% formaldehyde is returned to the absorption tower 10 through line 23.

A blend of the 37% and 60% formaldehyde solutions produced in absorber sections 10 and 11 respectively, is withdrawn as a formaldehyde product and results in an approximately 44% formaldehyde solution at a rate of 11,800 pounds per hour.

The tail gas from the absorption tower analyzes:

| | Mols/hr. |
|---|---|
| Formaldehyde | 8.22 |
| $CO_2$ | 17.2 |
| $O_2$ | 701.5 |
| $N_2$ | 3165.0 |
| Inerts | 41.0 |
| $H_2O$ | 253.0 |

While I have shown and described a preferred form of my invention, I am aware that variations may be made thereto and I, therefore desire a broad interpretation of my invention within the scope of the disclosure herein and the following claims.

I claim:

1. A process for the simultaneous production of an aqueous formaldehyde solution and paraformaldehyde crystals which comprises:

vaporizing methanol and mixing the same with air in a weight ratio of approximately 1:14;

passing said mixed gases over an oxidation catalyst selected from the group consisting of mixtures of molybdenum oxide and iron oxide at a temperature of between approximately 300 to 350° C. to form a formaldehyde containing gaseous effluent essentially free of methanol;

introducing said formaldehyde containing gaseous effluent into the lower portion of an absorption zone having a plurality of sections;

introducing water into the upper portion of said absorption zone;

maintaining the temperature of the lower portion of said absorption zone above 70° C.;

withdrawing from said absorption zone an aqueous formaldehyde solution containing between about 55 to 65 weight percent formaldehyde;

cooling a portion of said aqueous formaldehyde solution at a cooling rate of at least about 5° C. per hour to a temperature of about 30° C., whereby paraformaldehyde crystals are formed;

separating as product paraformaldehyde crystals from said cooled aqueous formaldehyde solution and recycling said cooled aqueous formaldehyde solution to an intermediate section of said absorption zone;

withdrawing a second aqueous formaldehyde solution of about 37 weight percent formaldehyde from an intermediate section of said absorption zone; and combining said second aqueous formaldehyde solution with the remaining portion of said aqueous formaldehyde solution containing 55 to 65 weight percent formaldehyde to form an aqueous formaldehyde solution containing from 37 to 48 weight percent formaldehyde as a product of said process.

2. A process as defined in claim 1, wherein the temperature of the bottom portion of said absorption zone is maintained above about 85° C.

3. A process as defined in claim 1, wherein said cooling rate is at least 10° C. per hour.

References Cited by the Examiner

UNITED STATES PATENTS

| | | | |
|---|---|---|---|
| 1,913,404 | 6/1933 | Meharg et al. | 260—603 |
| 1,913,405 | 6/1933 | Meharg et al. | 260—603 |
| 2,578,338 | 12/1951 | Craven | 260—615.5 |
| 3,113,972 | 12/1963 | Kodama et al. | 260—603 |

LEON ZITVER, *Primary Examiner.*

CHARLES B. PARKER, *Examiner.*

J. J. SETELIK, B. HELFIN, *Assistant Examiners.*